(12) United States Patent
Sasson et al.

(10) Patent No.: US 8,645,647 B2
(45) Date of Patent: Feb. 4, 2014

(54) DATA STORAGE SNAPSHOT WITH REDUCED COPY-ON-WRITE

(75) Inventors: Amir Sasson, Haifa (IL); Gil Sasson, Haifa (IL); Michael Sternberg, Haifa (IL); Uri Wolloch, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/552,460

(22) Filed: Sep. 2, 2009

(65) Prior Publication Data

US 2011/0055500 A1 Mar. 3, 2011

(51) Int. Cl.
*G06F 12/00* (2006.01)

(52) U.S. Cl.
USPC .................................. 711/162; 711/E12.103

(58) Field of Classification Search
USPC .......................................................... 711/162
See application file for complete search history.

(56) References Cited

U.S. PATENT DOCUMENTS

| | | | |
|---|---|---|---|
| 5,857,208 A | 1/1999 | Ofek | 707/204 |
| 6,078,932 A | 6/2000 | Haye | 707/204 |
| 6,212,531 B1 | 4/2001 | Blea | 707/204 |
| 6,341,341 B1 | 1/2002 | Grummon | 711/162 |
| 6,549,921 B1 | 4/2003 | Ofek | 707/1 |
| 6,829,688 B2 | 12/2004 | Grubbs | 711/162 |
| 6,983,352 B2 | 1/2006 | Keohane | 711/162 |
| 7,085,909 B2 | 8/2006 | Ananthanarayanan et al. | |
| 7,089,385 B1 | 8/2006 | Kiselev et al. | |
| 7,398,366 B2 | 7/2008 | Ohran et al. | |
| 7,788,456 B1 * | 8/2010 | Park | 711/161 |
| 2003/0140070 A1 | 7/2003 | Kaczmarski | 707/204 |
| 2003/0145248 A1 * | 7/2003 | McNeil | 714/13 |
| 2005/0081099 A1 | 4/2005 | Chang | 714/15 |
| 2006/0123211 A1 | 6/2006 | Derk | 711/161 |
| 2007/0073966 A1 | 3/2007 | Corbin | 711/114 |
| 2007/0130228 A1 | 6/2007 | Breau | 707/652 |
| 2007/0239944 A1 | 10/2007 | Rupanagunta | 711/154 |
| 2008/0126699 A1 | 5/2008 | Sangapu | 711/162 |
| 2008/0307019 A1 * | 12/2008 | Weiss et al. | 707/204 |

OTHER PUBLICATIONS

Bhavana Shah, "Disk Performance of Copy-On-Write Snapshot Logical Volumes," University of British Columbia, Aug. 2006, pp. 1-70.

* cited by examiner

*Primary Examiner* — Kenneth Lo
(74) *Attorney, Agent, or Firm* — VanLeeuwen & VanLeeuwen; Terrence J. Carroll (57) ABSTRACT

Producing snapshots of data stored on a data storage device, the method including producing a first snapshot of data stored in a set of data storage units on a data storage device, where the first snapshot is allowed to include data written to the set of data storage units during the production of the first snapshot, and producing a second snapshot of the data stored in the set of data storage units on the data storage device, where the production of the second snapshot is begun after the completion of the first snapshot, and where the second snapshot includes only data present in the set of data storage units before the production of the second snapshot is begun.

15 Claims, 10 Drawing Sheets

- FULL NON-CONSISTENT SNAPSHOT (W/O COW)

FOLLOWED BY

- ZERO OR MORE INCREMENTAL NON-CONSISTENT SNAPSHOTS (W/O COW)

FOLLOWED BY

- INCREMENTAL OR DIFFERENTIAL CONSISTENT SNAPSHOT (WITH COW)

Fig. 6A

- FULL CONSISTENT SNAPSHOT (WITH COW) OR FULL NON-CONSISTENT SNAPSHOT (W/O COW)

FOLLOWED BY

- INCREMENTAL OR DIFFERENTIAL NON-CONSISTENT SNAPSHOT (W/O COW)

FOLLOWED BY

- ZERO OR MORE INCREMENTAL NON-CONSISTENT SNAPSHOTS (W/O COW)

FOLLOWED BY

- INCREMENTAL CONSISTENT SNAPSHOT (WITH COW)

DATA STORAGE SNAPSHOT WITH REDUCED COPY-ON-WRITE

FIELD OF THE INVENTION

The invention relates to data storage in general, and more particularly to data recovery systems and methods therefor.

BACKGROUND OF THE INVENTION

In computing systems data that are stored on physical storage media are often copied periodically to secondary physical storage media, such as to allow the data to be reconstructed from the copies should the primary data become lost or corrupted. One type of copy is meant to reflect the state of the data at a particular point in time t and is referred to as a "snapshot" of the data. A "time-consistent" snapshot of data at time t includes all updates to the data that occurred before time t and does not include any updates to the data that occur after time t. One method that is used to achieve a time-consistent snapshot is called Copy-on-Write (COW), where data that have not yet been copied to secondary storage during the creation of a snapshot of data at time t are copied to memory or other temporary storage when it is detected that the data are about to be modified on the primary storage by an application. In this way modifications to data that occur after a time t are excluded from the snapshot. Unfortunately, COW operations often significantly interfere with system performance during snapshot creation due to the amount of resources needed to support COW operations and due to degradation of system I/O speed.

Systems and methods for producing snapshots of data with reduced COW would therefore be advantageous.

SUMMARY OF THE INVENTION

The invention in embodiments thereof discloses novel systems and methods for creating data storage snapshots with reduced copy-on-write.

In one aspect of the invention a method is provided for producing snapshots of data stored on a data storage device, the method including producing a first snapshot of data stored in a set of data storage units on a data storage device, where the first snapshot is allowed to include data written to the set of data storage units during the production of the first snapshot, and producing a second snapshot of the data stored in the set of data storage units on the data storage device, where the production of the second snapshot is begun after the completion of the first snapshot, and where the second snapshot includes only data present in the set of data storage units before the production of the second snapshot is begun.

In another aspect of the invention the method further includes producing at least one intermediate snapshot of the data stored in the set of data storage units on the data storage device, where the production of the intermediate snapshot is begun after the completion of the first snapshot and before the production of the second snapshot is begun, and where the intermediate snapshot is allowed to include data written to the set of data storage units during the production of the intermediate snapshot.

In another aspect of the invention the method further includes producing a full snapshot of the data stored in a set of data storage units on a data storage device, where the production of the first snapshot is begun after the completion of the full snapshot, and where the full snapshot is allowed to include data written to the set of data storage units during the production of the full snapshot.

In another aspect of the invention the method further includes producing a full snapshot of the data stored in a set of data storage units on a data storage device, where the production of the first snapshot is begun after the completion of the full snapshot, and where the full snapshot includes only data present in the set of data storage units before the production of the full snapshot is begun.

In another aspect of the invention the producing of the first snapshot includes producing any of a full, differential, or incremental snapshot.

In another aspect of the invention the producing of the second snapshot includes producing an incremental snapshot.

In another aspect of the invention the producing of the intermediate snapshot includes producing an incremental snapshot.

In another aspect of the invention a system is provided for producing snapshots of data stored on a data storage device, the system including a snapshot controller configured to produce a first snapshot of data stored in a set of data storage units on a data storage device, where the first snapshot is allowed to include data written to the set of data storage units during the production of the first snapshot, and a second snapshot of the data stored in the set of data storage units on the data storage device, where the production of the second snapshot is begun after the completion of the first snapshot, and a copy-on-write controller selectably employable by the snapshot controller to include in the second snapshot only data present in the set of data storage units before the production of the second snapshot is begun.

In another aspect of the invention the snapshot controller is configured to produce at least one intermediate snapshot of the data stored in the set of data storage units on the data storage device, where the production of the intermediate snapshot is begun after the completion of the first snapshot and before the production of the second snapshot is begun, and where the intermediate snapshot is allowed to include data written to the set of data storage units during the production of the intermediate snapshot.

In another aspect of the invention the snapshot controller is configured to produce a full snapshot of the data stored in a set of data storage units on a data storage device, where the production of the first snapshot is begun after the completion of the full snapshot, and where the full snapshot is allowed to include data written to the set of data storage units during the production of the full snapshot.

In another aspect of the invention the snapshot controller is configured to produce a full snapshot of the data stored in a set of data storage units on a data storage device, where the production of the first snapshot is begun after the completion of the full snapshot, and where the copy-on-write controller is selectably employable by the snapshot controller to include in the full snapshot includes only data present in the set of data storage units before the production of the full snapshot is begun. In another aspect of the invention the snapshot controller is configured to produce any of a full, differential, or incremental snapshot.

In another aspect of the invention the snapshot controller is configured to produce the second snapshot as an incremental snapshot.

In another aspect of the invention the snapshot controller is configured to produce the intermediate snapshot as an incremental snapshot.

In another aspect of the invention a computer program product is provided for producing snapshots of data stored on a data storage device, the computer program product including a computer readable medium, and computer program instructions operative to produce a first snapshot of data stored in a set of data storage units on a data storage device, where the first snapshot is allowed to include data written to the set of data storage units during the production of the first snapshot, and produce a second snapshot of the data stored in the set of data storage units on the data storage device, where the production of the second snapshot is begun after the completion of the first snapshot, and where the second snapshot includes only data present in the set of data storage units before the production of the second snapshot is begun, and where the program instructions are stored on the computer readable medium.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, device, or suitable combination of the foregoing. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or any suitable combination of the foregoing. A computer readable signal medium may be, for example but not limited to, a transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
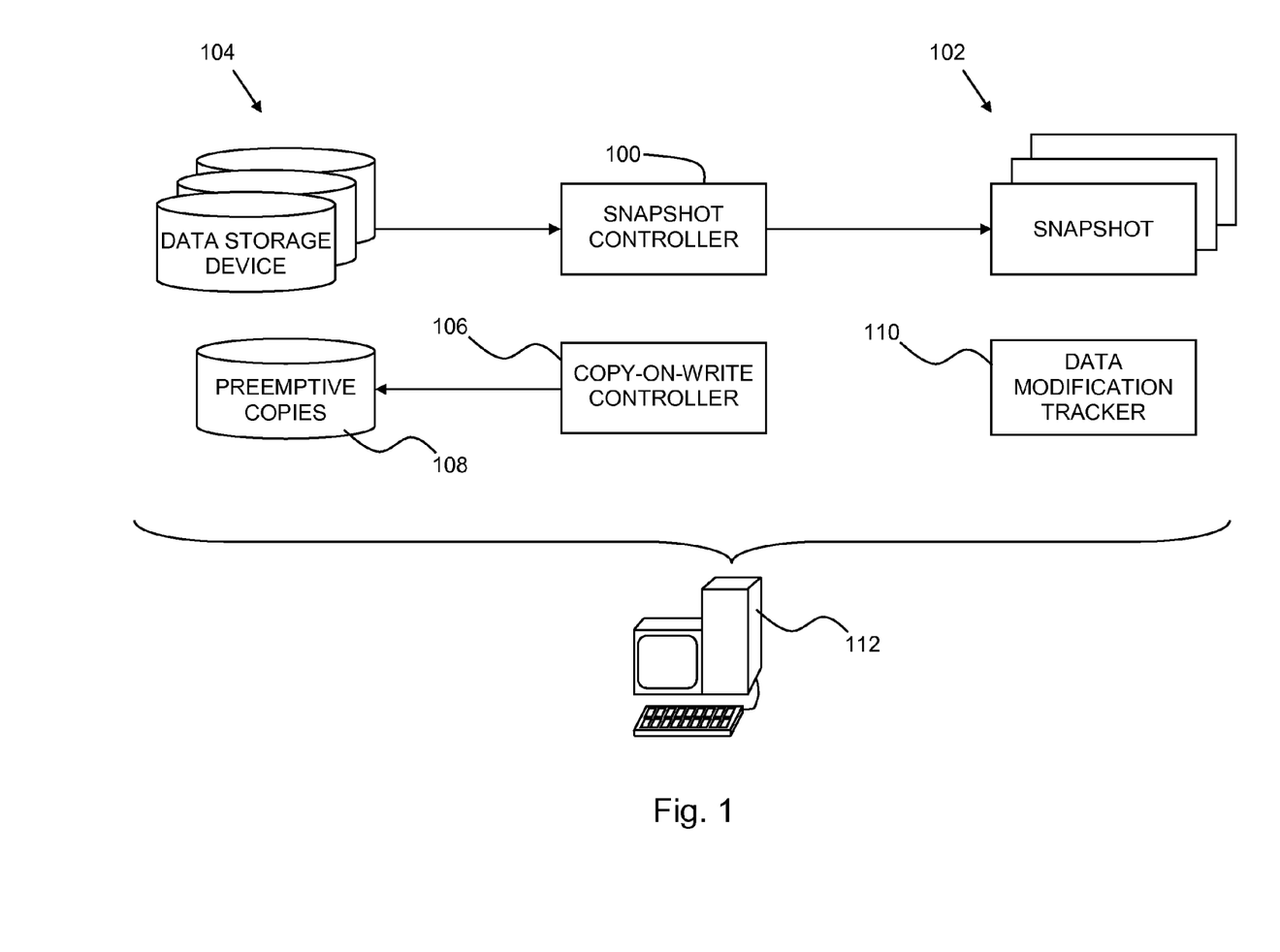
FIG. 1 is a simplified conceptual illustration of a system for producing snapshots of data stored on a data storage device, constructed and operative in accordance with an embodiment of the invention.

Reference is now made to FIG. 1 which is a simplified conceptual illustration of a system for producing snapshots of data stored on a data storage device, constructed and operative in accordance with an embodiment of the invention. In the system of FIG. 1, a snapshot controller 100 produces point-in-time snapshots 102 of data stored on one or more data storage devices 104, which may be any type of physical data storage devices such as, but not limited to, magnetic or optical disks or flash memory. Each snapshot 102 is preferably produced from the data stored in a predefined set of data storage units found on data storage devices 104, such as, but not limited to, a predefined set of files, sectors, or blocks. When snapshot controller 100 produces a snapshot a Copy-on-Write controller 106 is selectably employed to identify when modifications are about to be made to data that have not yet been included in the snapshot, whereupon Copy-on-Write controller 106 preemptively copies the data before the modification is made, typically storing the copy in memory or other temporary storage 108. The copy of the pre-modified data is then included in the snapshot. A data modification tracker 110 preferably records the locations of data storage units where modifications were made during the production of a snapshot and that were therefore not included in the snapshot. Snapshot controller 100 preferably uses such records to identify data that are to be included in a subsequent snapshot.

Figure 2:
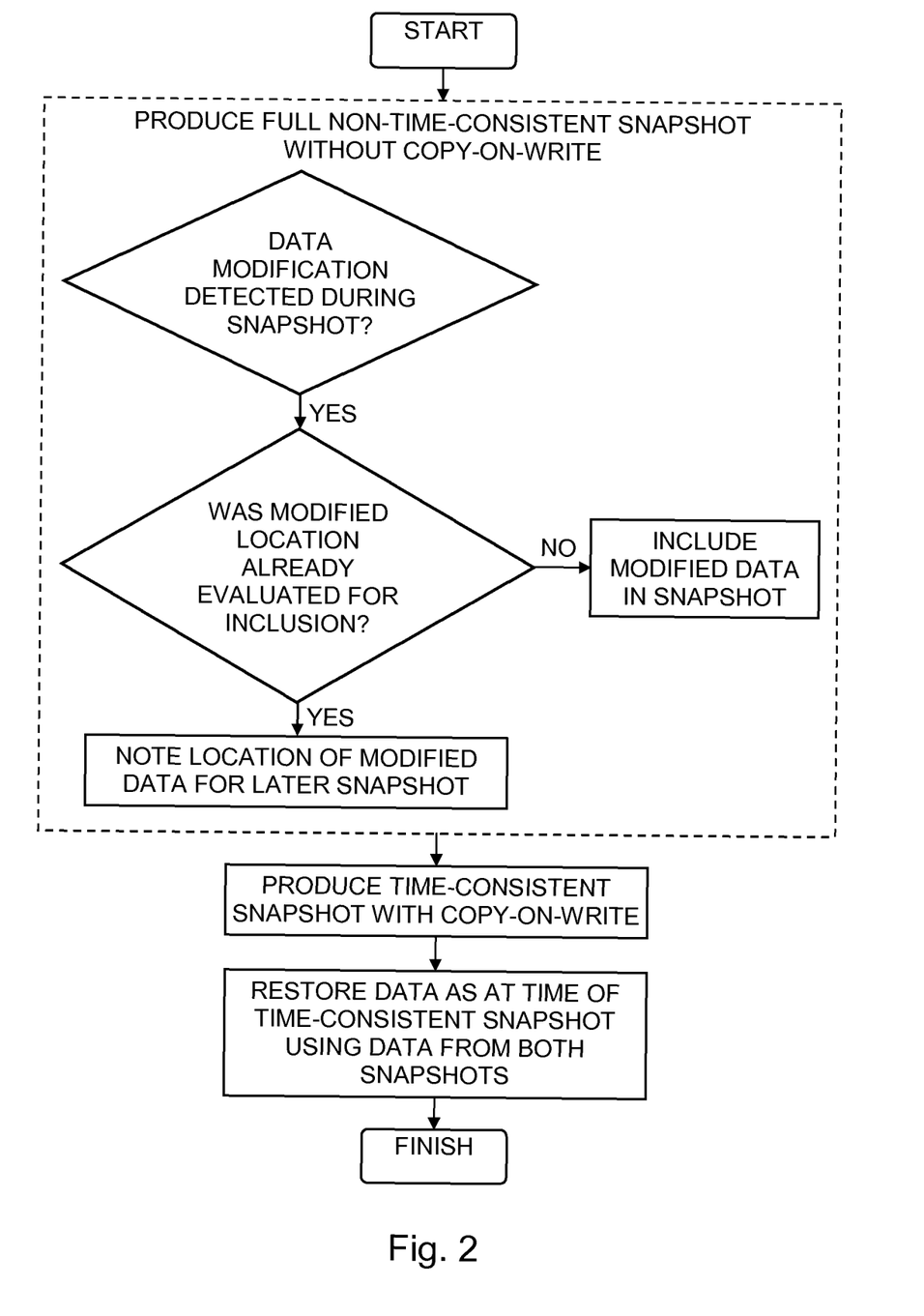
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, a full snapshot is produced of all of the data stored in a primary set of data storage units on a data storage device. The full snapshot is preferably produced using conventional techniques except as otherwise described herein. The full snapshot includes data present in the set of data storage units at a first point in time $t_1$, yet is allowed to include modifications to the data being copied that occur after time $t_1$ as well, thereby allowing the full snapshot to become a non-time-consistent snapshot. Thus, in contrast to a full snapshot that is a time-consistent snapshot, the full snapshot in the current embodiment is preferably made without employing a technique, such as Copy-on-Write, that would otherwise ensure that the snapshot includes no modifications to the data being copied that occur after time $t_1$. As a result, a modification to data stored in a data storage unit that occurs after time $t_1$ may or may not be included in the full snapshot, depending on whether the data stored in the data storage unit were modified before or after the data storage unit was evaluated by the copying process for inclusion of its data in the full snapshot. In accordance with conventional techniques a record is preferably maintained, such as in the form of a bitmap, indicating which data storage units, if any, are modified after time $t_1$, although any data storage units that are modified after time $t_1$ but whose data are included in the full snapshot are preferably excluded from this record.

An incremental or differential snapshot of the data stored in the set of data storage units is produced after the full snapshot is completed, where the incremental snapshot includes only data that are written to the set of data storage units after time $t_1$, that are not included in the full snapshot, and that are present in the set of data storage units at a second point in time $t_2$, to which end a technique, such as Copy-on-Write, is employed to ensure that the incremental or differential snapshot is a time-consistent snapshot that includes no modifications to the data being copied that occur after time $t_2$. If the snapshot is an incremental snapshot, it may be constructed using the record indicating which data storage units, if any, were modified after time $t_1$.

By employing the method of FIG. 2, each item of the data present in the set of data storage units on the data storage device at time $t_2$ will be found in at least one of the snapshots, and thereafter the data that were present in the set of data storage units at time $t_2$ may be reconstructed from both of the snapshots should the primary data become lost or corrupted. Furthermore, by producing a full snapshot that is a non-time-consistent snapshot prior to producing a time-consistent snapshot, the time-consistent snapshot may be produced with reduced Copy-on-Write coverage than would otherwise be the case were no preceding non-time-consistent snapshot made.

Figure 3A:
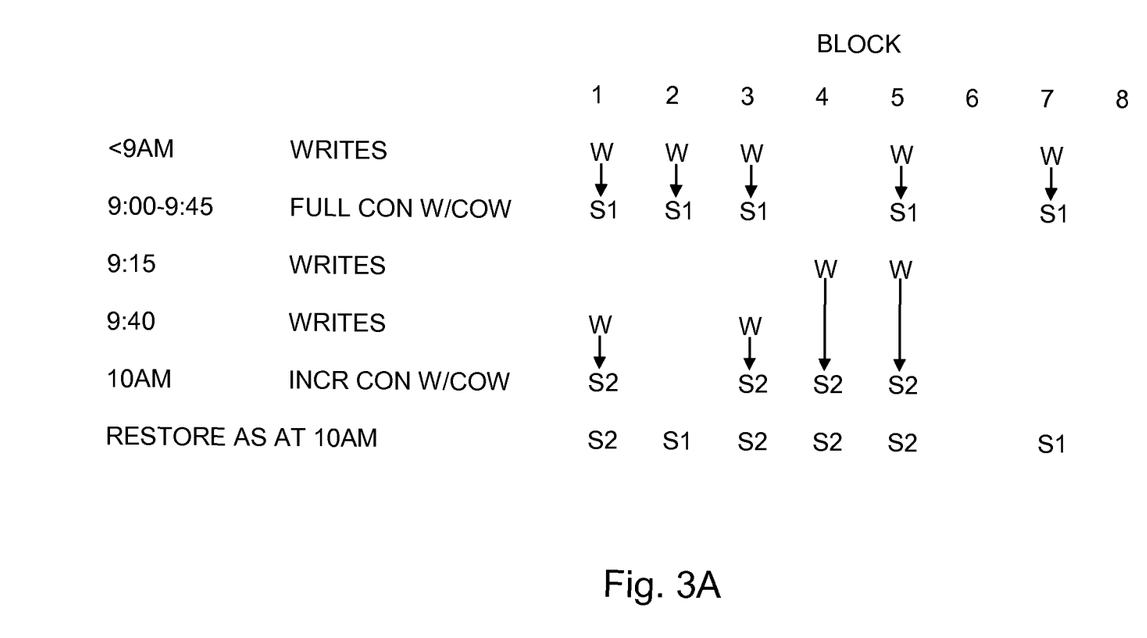
FIGS. 3A and 3B are simplified tabular illustrations useful in understanding the invention.
Figure 3B:
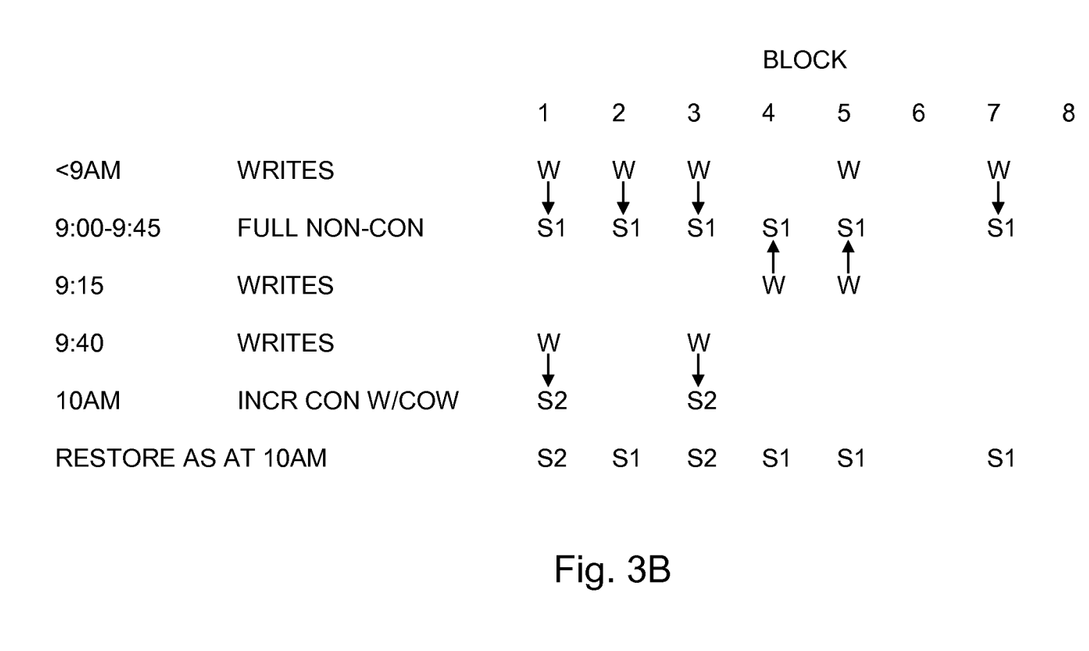

The invention may be appreciated by way of example as shown in FIGS. 3A and 3B. In FIG. 3A snapshots of a set of data blocks are made without employing the invention as described herein. Thus, in FIG. 3A, data blocks labeled 1-8 are shown, where data is written to blocks 1, 2, 3, 5, and 7 (indicated by 'W') prior to 9 am. At 9 am production of a full snapshot is begun of blocks 1-8, during which time Copy-on-Write protection is employed and potentially implemented for all eight blocks, thereby producing a time-consistent snapshot. As only blocks 1, 2, 3, 5, and 7 contain data, only these blocks are included in the snapshot (indicated by 'S1'). At 9:15 am data are written to blocks 4 and 5, and at 9:40 am data are written to blocks 1 and 3, where a record (not shown) is maintained indicating which blocks were written to after 9 am. At 10 am production of a time-consistent snapshot, preferably being an incremental snapshot, is begun of blocks 1-8, during which time Copy-on-Write is employed. Since data were written to blocks 1, 3, 4, and 5 after 9 am, only these blocks are included in the time-consistent snapshot (indicated by 'S2'), during which time Copy-on-Write protection is potentially implemented for all four blocks. The data in blocks 1-8 may then be reconstructed as they were at 10 am, where the data for blocks 2 and 7 are drawn from the full snapshot, and the data for blocks 1 and 3-5 are drawn from the time-consistent snapshot. In the example shown in FIG. 3A, Copy-on-Write protection is potentially implemented for eight blocks of the full snapshot and four blocks of the incremental snapshot.

In FIG. 3B the invention is employed in accordance with the embodiment of FIG. 2. Thus, in FIG. 3B, data blocks labeled 1-8 are shown, where data is written to blocks 1, 2, 3, 5, and 7 (indicated by 'W') prior to 9 am. At 9 am production of a full snapshot is begun of blocks 1-8, during which time Copy-on-Write protection is not employed, thereby producing a non-time-consistent snapshot. As only blocks 1, 2, 3, 5, and 7 contain data, these blocks are included in the snapshot (indicated by 'S1'). At 9:15 am data are written to blocks 4 and 5, and at 9:40 am data are written to blocks 1 and 3, where a record is maintained indicating which blocks were written to after 9 am. The data written to blocks 4 and 5 at 9:15 am are included in the full snapshot, whereas the data that are written to blocks 1 and 3 at 9:40 am are not, as blocks 1 and 3 were already evaluated by the copying process for inclusion of their data in the full snapshot prior to their modification. At 10 am production of an incremental snapshot is begun of blocks 1-8 where Copy-on-Write is employed. Although data were written to blocks 1, 3, 4, and 5 after 9 am, the data written to blocks 4 and 5 after 9 am were included in the intermediate snapshot, and thus only the data in blocks 1 and 3 are included in the incremental snapshot (indicated by 'S2'), during which time Copy-on-Write protection is potentially implemented for only two of the four blocks to which data were written to after 9 am. The data in blocks 1-8 may then be reconstructed as they were at 10 am, where the data for blocks 2 and 4-7 are drawn from the full snapshot, while the data for blocks 1 and 3 are drawn from the incremental snapshot. However, in the example shown in FIG. 3B, Copy-on-Write protection is not implemented at all for the full snapshot, and is potentially implemented for only two blocks of the incremental snapshot.

Thus, by producing a full snapshot for which time-consistency is waived, followed by a time-consistent incremental snapshot, Copy-on-Write protection may be extended to fewer blocks overall than would otherwise be the case, and without any attendant loss in the ability to reconstruct the data.

Figure 4:
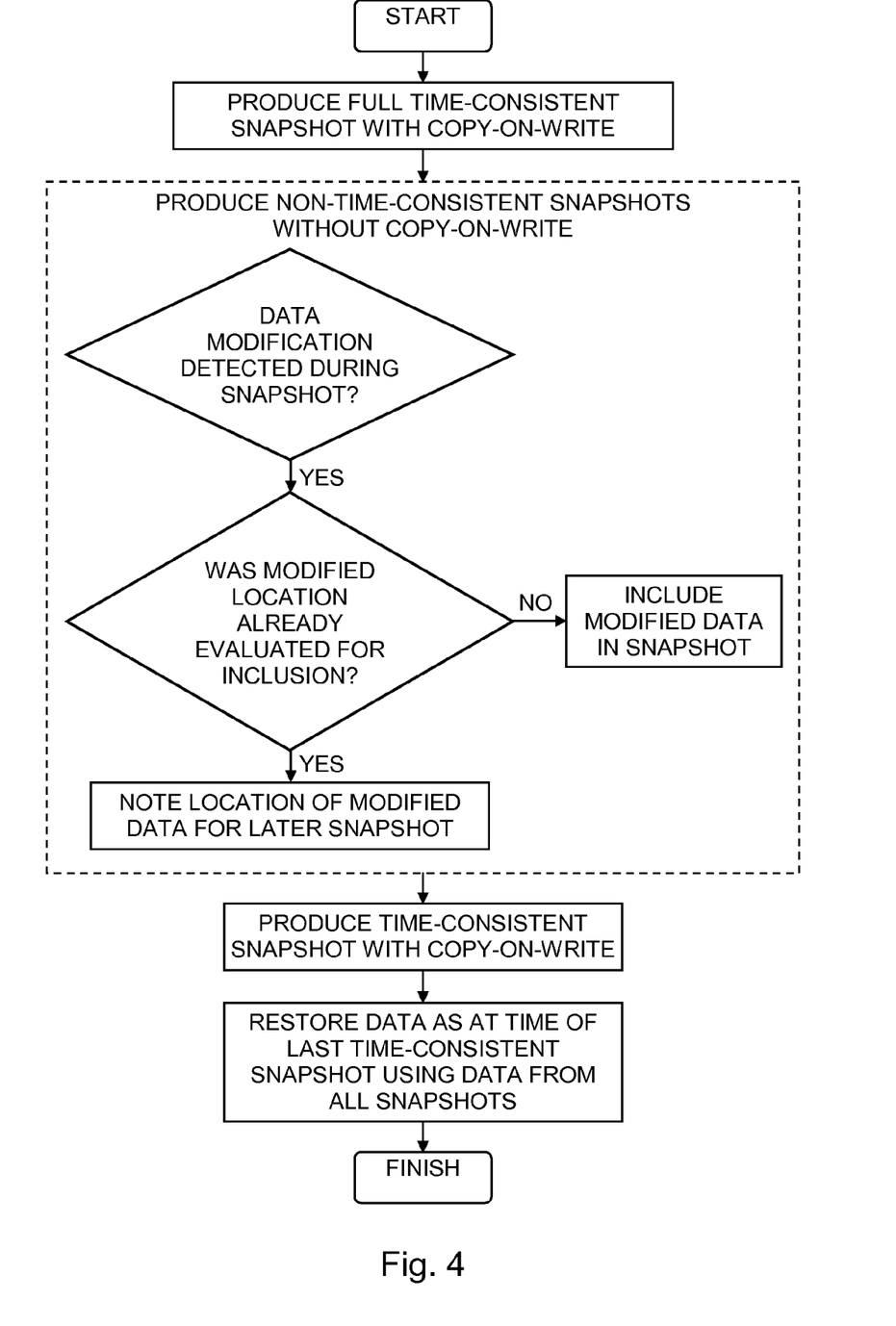
FIG. 4 is a simplified flowchart illustration of an alternative exemplary method of operation of the system of FIG. 1, operative in accordance with an embodiment of the invention.

Reference is now made to FIG. 4, which is a simplified flowchart illustration of an exemplary method of operation of the system of FIG. 1, operative in accordance with an alternative embodiment of the invention. In the method of FIG. 4, a full snapshot is produced of all of the data stored in a primary set of data storage units on a data storage device. The full snapshot is preferably produced using conventional techniques except as otherwise described herein. The full snapshot includes only data present in the set of data storage units at a first point in time $t_1$, to which end a technique, such as Copy-on-Write is preferably employed to ensure that the full snapshot is a time-consistent snapshot that includes no modifications to the data being copied that occur after time $t_1$. In accordance with conventional techniques a record is preferably maintained, such as in the form of a bitmap, indicating which data storage units, if any, are modified after time $t_1$.

An intermediate snapshot of the data stored in the set of data storage units is produced after the full snapshot is completed, where the intermediate snapshot includes data present in the set of data storage units at a second point in time $t_2$. However, unlike the full snapshot, the intermediate snapshot is allowed to include modifications to the data being copied that occur after time $t_2$ as well, thereby allowing the intermediate snapshot to become a non-time-consistent snapshot. Thus, unlike the full snapshot, the intermediate snapshot is preferably made without employing a technique, such as Copy-on-Write, that would otherwise ensure that the snapshot is a time-consistent snapshot that includes no modifications to the data being copied that occur after time $t_2$. As a result, a modification to data stored in a data storage unit that occur after time $t_2$ may or may not be included in the intermediate snapshot, depending on whether the data stored in the data storage unit were modified before or after the data storage unit was evaluated by the copying process for inclusion of its data in the intermediate snapshot. The intermediate snapshot is preferably an incremental or differential snapshot of the data stored in the set of data storage units, and is preferably produced using conventional techniques except as otherwise described herein. Where the intermediate snapshot is an incremental snapshot of the data stored in the set of data storage units, the intermediate snapshot is preferably constructed using the record indicating which data storage units, if any, were modified after time $t_1$. As before, a record is preferably maintained, in accordance with conventional techniques, indicating which data storage units, if any, are modified after time $t_2$, although any data storage units that are modified after time $t_2$ but that are included in the intermediate snapshot are preferably excluded from this record.

An incremental snapshot of the data stored in the set of data storage units is produced after the intermediate snapshot is completed, where the incremental snapshot includes only data written to the set of data storage units after time $t_2$, and only if the data are present in the set of data storage units at a third point in time $t_3$, to which end a technique, such as Copy-on-Write, is employed to ensure that the incremental snapshot is a time-consistent snapshot that includes no modifications to the data being copied that occur after time $t_3$.

By employing the method of FIG. 4, each item of the data present in the set of data storage units on the data storage device at time $t_3$ will be found in at least one of the snapshots, and thus the data may be reconstructed from the snapshots should the primary data become lost or corrupted. Furthermore, by producing an intermediate snapshot that is a non-time-consistent snapshot prior to producing an incremental snapshot that is a time-consistent snapshot, the incremental snapshot may be produced with reduced Copy-on-Write coverage than would otherwise be the case were no intermediate snapshot made or were it made as a time-consistent snapshot employing Copy-on-Write.

Figure 5A:
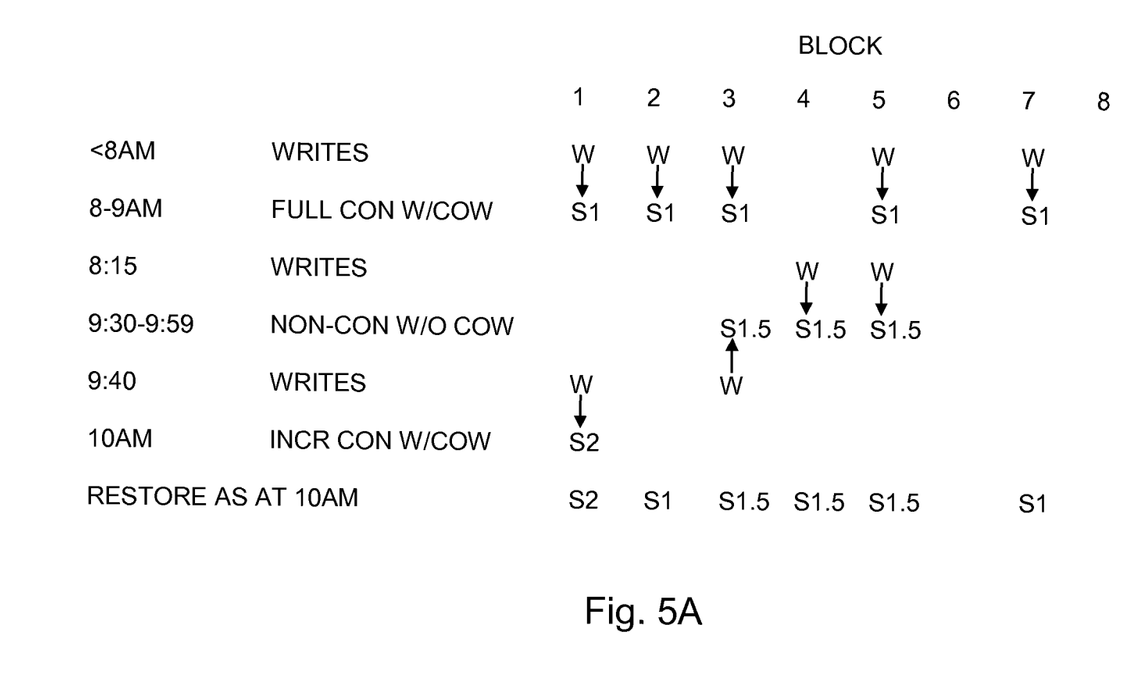
FIGS. 5A-5C are simplified tabular illustrations useful in understanding the invention.
Figure 5B:
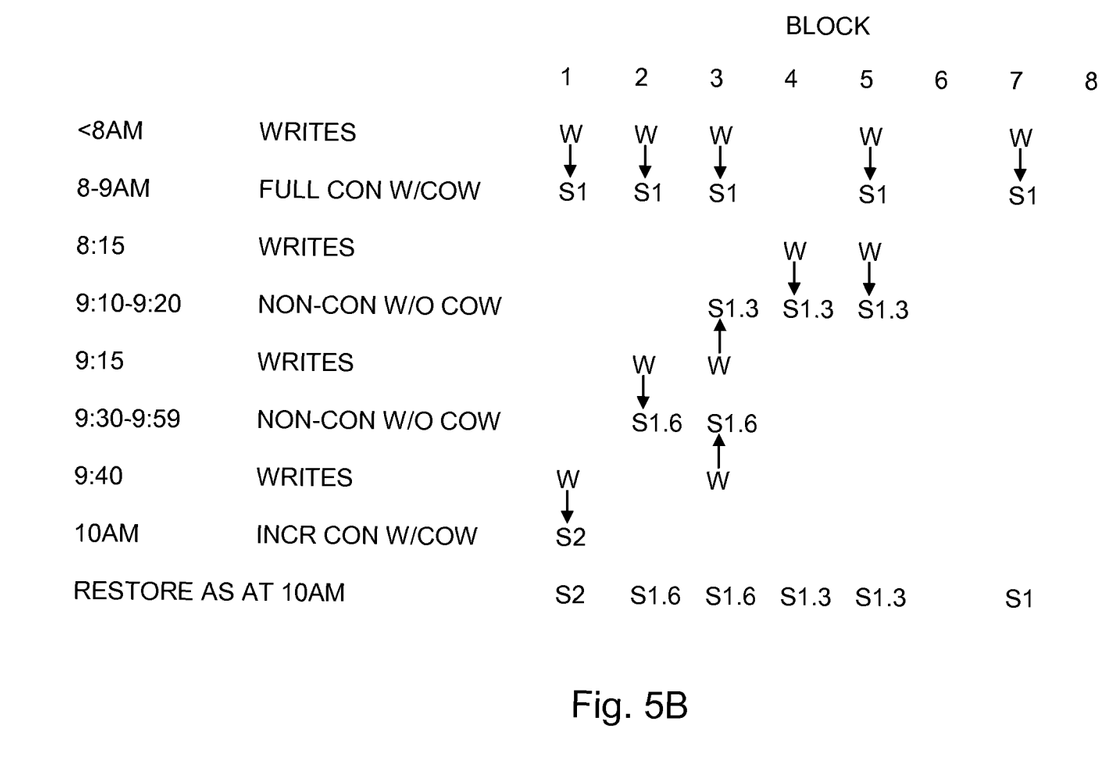
Figure 5C:
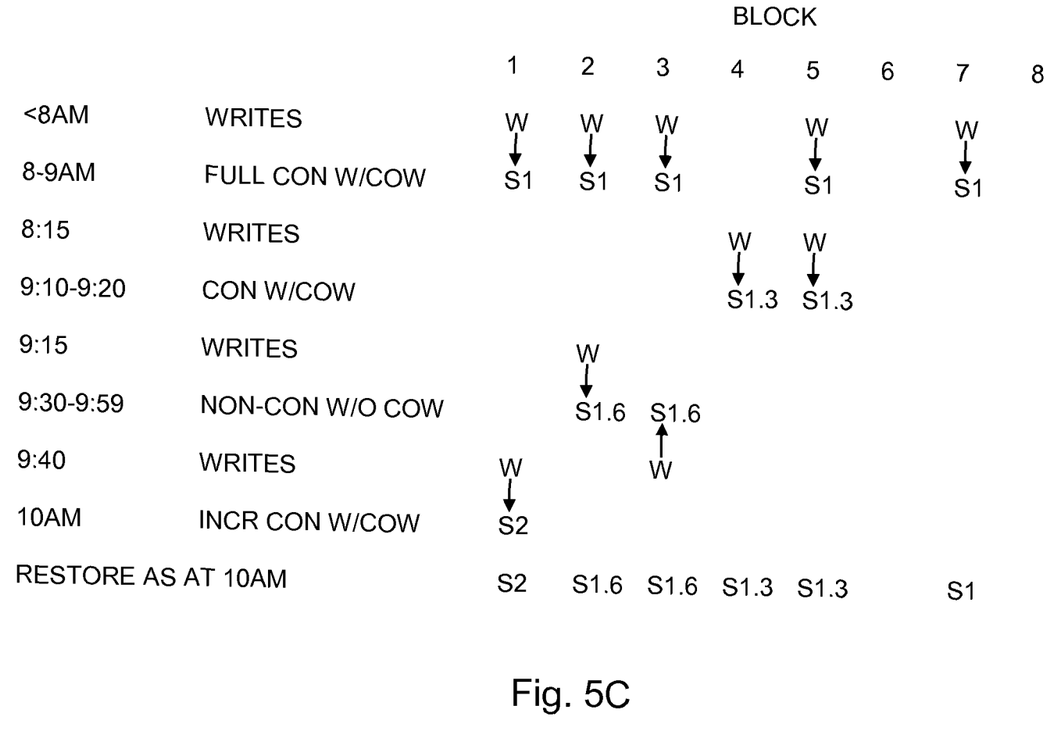

The invention may be appreciated by way of example as shown in FIGS. 5A-5C in which the invention is employed in accordance with the embodiment of FIG. 4. Thus, in FIG. 5A, data blocks labeled 1-8 are shown, where data is written to blocks 1, 2, 3, 5, and 7 (indicated by 'W') prior to 8 am. At 8 am production of a full snapshot is begun of blocks 1-8, during which time Copy-on-Write protection is employed, thereby producing a time-consistent snapshot. As only blocks 1, 2, 3, 5, and 7 contain data, only these blocks are included in the snapshot (indicated by 'S1'). At 8:15 am data are written to blocks 4 and 5, and at 9:40 am data are written to blocks 1 and 3, where a record is maintained indicating which blocks were written to after 8 am. An intermediate snapshot is produced between 9:30 am-9:59 am, during which time Copy-on-Write protection is not employed. The data written to blocks 4 and 5 at 8:15 am are included in the intermediate snapshot (indicated by 'S1.5'), whereas of the data that are written to blocks 1 and 3 at 9:40 am, only the data written to block 3 is included in the intermediate snapshot, as block 1 was already evaluated by the copying process for inclusion of its data in the intermediate snapshot prior to its modification, but block 3 was not. At 10 am production of an incremental snapshot is begun of blocks 1-8, during which time Copy-on-Write protection is employed. Although data were written to blocks 1, 3, 4, and 5 after 8 am, the data written to blocks 3, 4, and 5 after 8 am were included in the intermediate snapshot, and thus only the data written to block 1 after 8 am is included in the incremental snapshot (indicated by 'S2'), during which time Copy-on-Write protection is potentially implemented for that block only. The data in blocks 1-8 may then be reconstructed as they were at 10 am, where the data for blocks 2 and 7 are drawn from the full snapshot, the data for blocks 3, 4, and 5 are drawn from the intermediate snapshot, and the data for block 1 are drawn from the incremental snapshot.

The examples shown in FIGS. 5B and 5C are similar to the example shown in FIG. 5A, with the notable exception that FIG. 5B demonstrates the use of multiple intermediate snapshots without Copy-on-Write, while FIG. 5C demonstrates the use of multiple intermediate snapshots with and without Copy-on-Write. Preferably, where multiple intermediate snapshots are produced, no intermediate snapshot is started while another intermediate snapshot is still being produced.

Figure 6A:
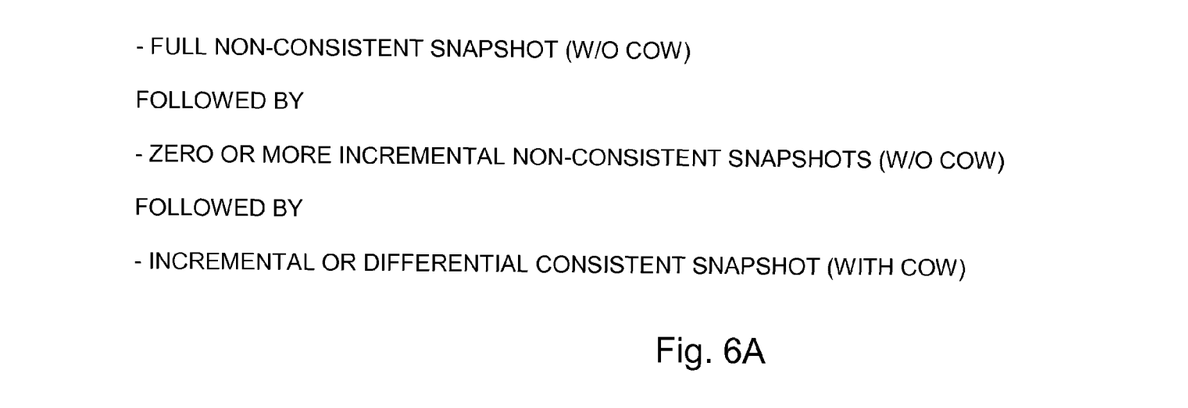
FIGS. 6A and 6B are pseudocode of various combinations of time-consistent and non-time-consistent snapshots of data that may be produced in accordance with an various embodiments of the invention.
Figure 6B:
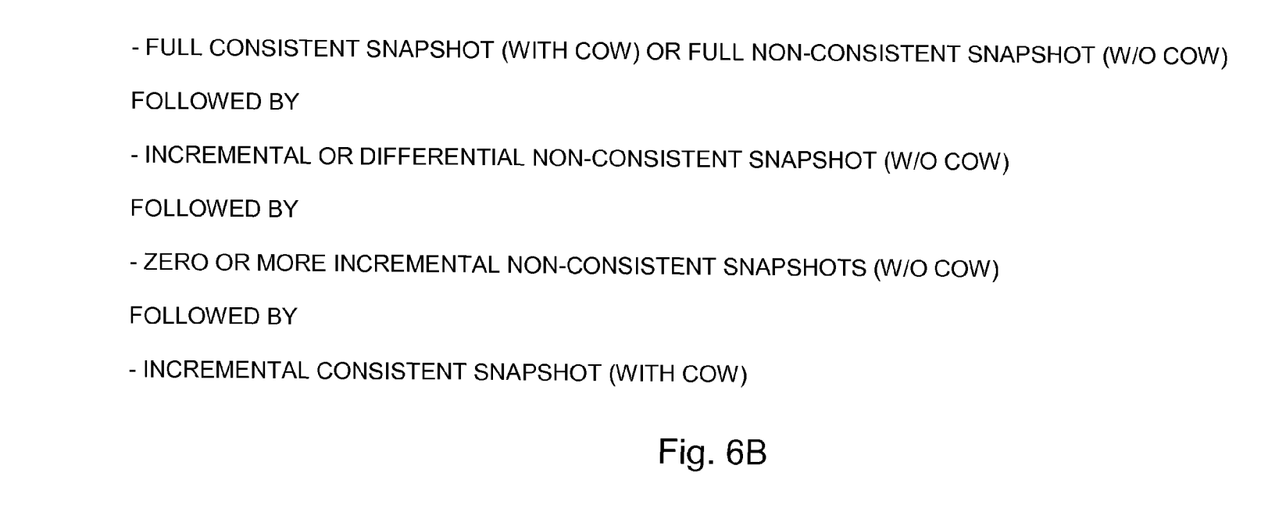

Reference is now made to FIGS. 6A and 6B which provide pseudocode of various combinations of time-consistent and non-time-consistent snapshots of data that may be produced, operative in accordance with an various embodiments of the invention. By employing any of the embodiments shown, data may be fully reconstructed from various combinations of time-consistent and non-time-consistent snapshots while reducing the amount of processing that would otherwise be required were all snapshots required to be consistent.

It will be appreciated that any aspect of the invention described hereinabove may be implemented as a computer program product embodied in a computer-readable medium, such as in the form of computer program instructions stored on magnetic or optical storage media or embedded within computer hardware, and may be executed by or otherwise be made accessible to a computer 112 (FIG. 1).

Figure 7:
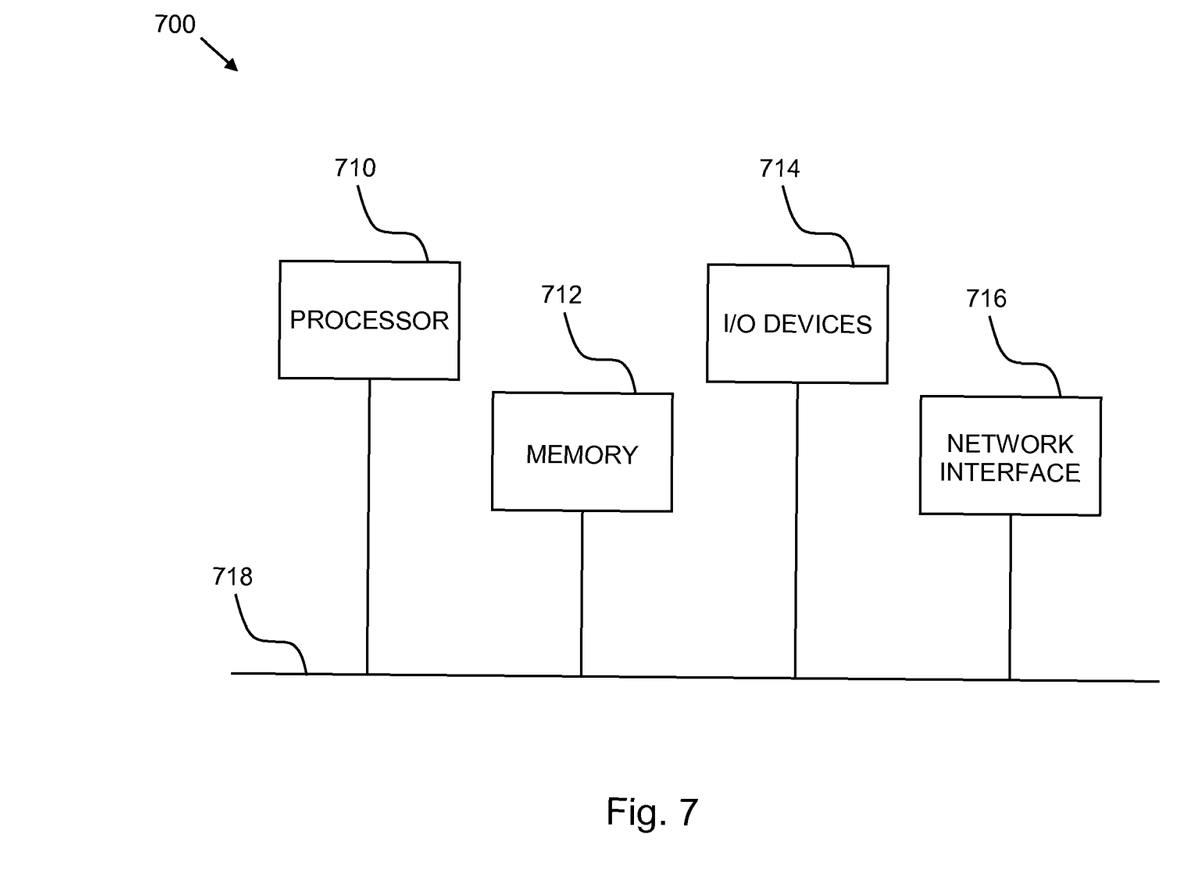
FIG. 7 is a simplified block diagram illustrating an exemplary hardware implementation of a computing system, constructed and operative in accordance with an embodiment of the invention.

Referring now to FIG. 7, block diagram 700 illustrates an exemplary hardware implementation of a computing system in accordance with which one or more components/methodologies of the invention (e.g., components/methodologies described in the context of FIGS. 1, 2, and 4) may be implemented, according to an embodiment of the invention.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for producing snapshots of data stored on a data storage device, the method comprising:
producing a first snapshot of data stored in a set of data storage units on a data storage device, wherein said first snapshot is allowed to include data written to said set of data storage units during the production of said first snapshot; and
producing a second snapshot of said data stored in said set of data storage units on said data storage device,
wherein the production of said second snapshot is begun after the completion of said first snapshot, and
wherein said second snapshot includes only data written to said set of data storage units during the production of said first snapshot that is not included in the first snapshot.

2. A method according to claim 1 and further comprising producing a full snapshot of said data stored in a set of data storage units on a data storage device,
wherein the production of said first snapshot is begun after the completion of said full snapshot, and
wherein said full snapshot is allowed to include data written to said set of data storage units during the production of said full snapshot.

3. A method according to claim 1 and further comprising producing a full snapshot of said data stored in a set of data storage units on a data storage device,
wherein the production of said first snapshot is begun after the completion of said full snapshot, and
wherein said full snapshot includes only data present in said set of data storage units before the production of said full snapshot is begun.

4. A method according to claim 1 wherein said producing of said first snapshot comprises producing any of a full, differential, or incremental snapshot.

5. A method according to claim 1 wherein said producing of said second snapshot comprises producing an incremental snapshot.

6. A system for producing snapshots of data stored on a data storage device, the system comprising:
a snapshot controller configured to produce a first snapshot of data stored in a set of data storage units on a data storage device, wherein said first snapshot is allowed to include data written to said set of data storage units during the production of said first snapshot, and a second snapshot of said data stored in said set of data storage units on said data storage device, wherein the production of said second snapshot is begun after the completion of said first snapshot; and
a copy-on-write controller selectably employable by said snapshot controller to include in said second snapshot only data written to said set of data storage units during the production of said first snapshot that is not included in the first snapshot.

7. A system according to claim 5 wherein said snapshot controller is configured to produce a full snapshot of said data stored in a set of data storage units on a data storage device, wherein the production of said first snapshot is begun after the completion of said full snapshot, and wherein said full snapshot is allowed to include data written to said set of data storage units during the production of said full snapshot.

8. A system according to claim 5 wherein said snapshot controller is configured to produce a full snapshot of said data stored in a set of data storage units on a data storage device, wherein the production of said first snapshot is begun after the completion of said full snapshot, and wherein said copy-on-write controller is selectably employable by said snapshot controller to include in said full snapshot includes only data present in said set of data storage units before the production of said full snapshot is begun.

9. A system according to claim 5 wherein said snapshot controller is configured to produce any of a full, differential, or incremental snapshot.

10. A system according to claim 5 wherein said snapshot controller is configured to produce said second snapshot as an incremental snapshot.

11. A computer program product for producing snapshots of data stored on a data storage device, the computer program product comprising:

a computer readable storage medium; and computer program instructions operative to produce a first snapshot of data stored in a set of data storage units on a data storage device, wherein said first snapshot is allowed to include data written to said set of data storage units during the production of said first snapshot, and produce a second snapshot of said data stored in said set of data storage units on said data storage device, wherein the production of said second snapshot is begun after the completion of said first snapshot, and wherein said second snapshot includes only data written to said set of data storage units during the production of said first snapshot that is not included in the first snapshot wherein said program instructions are stored on said computer readable storage medium.

12. The computer program product of claim 11 wherein the computer program instructions are further operative to:

produce a full snapshot of said data stored in a set of data storage units on a data storage device;

wherein the production of said first snapshot is begun after the completion of said full snapshot; and wherein said full snapshot is allowed to include data written to said set of data storage units during the production of said full snapshot.

13. The computer program product of claim 11 wherein the computer program instructions are further operative to:

produce a full snapshot of said data stored in a set of data storage units on a data storage device, wherein the production of said first snapshot is begun after the completion of said full snapshot, and wherein said full snapshot includes only data present in said set of data storage units before the production of said full snapshot is begun.

14. The computer program product of claim 11 wherein said producing of said first snapshot comprises producing any of a full, differential, or incremental snapshot.

15. The computer program product of claim 11 wherein said producing of said second snapshot comprises producing an incremental snapshot.

* * * * *